(12) United States Patent
Ward

(10) Patent No.: US 7,478,684 B2
(45) Date of Patent: Jan. 20, 2009

(54) SOIL CONDITIONING DEVICE

(75) Inventor: Keith Ward, Bourne (GB)

(73) Assignee: Terramanus Technologies LLC, Salem, IN (US)

( * ) Notice: Subject to any disclaimer, the term of this patent is extended or adjusted under 35 U.S.C. 154(b) by 0 days.

(21) Appl. No.: 11/176,569

(22) Filed: Jul. 7, 2005

(65) Prior Publication Data

US 2007/0007022 A1    Jan. 11, 2007

(51) Int. Cl.
*A01B 39/08* (2006.01)
(52) U.S. Cl. ......................................... 172/537; 172/21
(58) Field of Classification Search .................. 172/21, 172/537, 540, 554; 111/178; 301/43; 152/5, 152/300, 301, 302, 306; 404/130, 131
See application file for complete search history.

(56) References Cited

U.S. PATENT DOCUMENTS

| | | | | |
|---|---|---|---|---|
| 895,230 | A * | 8/1908 | Beier | 172/554 |
| 948,389 | A * | 2/1910 | Cairns | 152/300 |
| 1,148,347 | A * | 7/1915 | Zipay | 152/97 |
| 1,190,601 | A | 7/1916 | Smith | |
| 1,250,570 | A | 12/1917 | Dunham | |
| 1,291,772 | A | 1/1919 | Currier | |
| 1,304,871 | A | 5/1919 | Garst | |
| 1,402,947 | A | 1/1922 | Myers | |
| 1,477,089 | A | 12/1923 | Towner | |
| 1,714,852 | A | 5/1929 | Denitson, Jr. | |
| 1,782,201 | A | 11/1930 | Dunham | |
| 1,943,620 | A * | 1/1934 | Murray | 301/40.1 |
| 2,029,872 | A | 2/1936 | Johnson | |
| 2,143,471 | A * | 1/1939 | Booharin | 152/336.1 |
| 2,146,222 | A * | 2/1939 | Pace | 172/539 |
| 2,911,893 | A | 11/1959 | Archibald et al. | |
| 2,966,948 | A | 1/1961 | Ulsh | |
| 3,171,498 | A | 3/1965 | Logan | |
| 3,207,234 | A | 9/1965 | Stewart | |
| 3,297,096 | A * | 1/1967 | Wooldridge | 172/464 |
| 3,463,063 | A * | 8/1969 | Caron et al. | 404/124 |
| 3,650,185 | A | 3/1972 | Takata | |
| 3,718,170 | A | 2/1973 | Caron et al. | |
| 3,822,655 | A | 7/1974 | Benedict et al. | |
| 3,891,341 | A * | 6/1975 | Trainor et al. | 404/121 |

(Continued)

FOREIGN PATENT DOCUMENTS

DE    29615079    12/1996

(Continued)

OTHER PUBLICATIONS

"Sunco Prop," Marketing Brochure, www.suncomarketing.com, U.S.A.

(Continued)

*Primary Examiner*—Thomas B Will
*Assistant Examiner*—Jamie L McGowan
(74) *Attorney, Agent, or Firm*—James E. Cole; Middleton Reutlinger

(57) ABSTRACT

A soil conditioning device having a series of peripheral ridge members having a leading and trailing prow shaped surface circumscribing a disc, wheel or drum and a method of use. Optionally the prow shaped peripheral ridge members are joined by sub-ridge members forming a single ridge of varying heights circumscribing the disc, wheel or drum.

30 Claims, 9 Drawing Sheets

U.S. PATENT DOCUMENTS

| | | | |
|---|---|---|---|
| 3,922,106 A * | 11/1975 | Caron et al. ............... 404/121 |
| 3,998,275 A | 12/1976 | Eisenhardt |
| 4,066,375 A | 1/1978 | Caron et al. |
| 4,074,942 A * | 2/1978 | Cochran .................... 404/121 |
| 4,098,349 A | 7/1978 | Jilani |
| 4,102,406 A | 7/1978 | Orthman |
| 4,158,392 A | 6/1979 | Belanger |
| 4,164,190 A | 8/1979 | Newman |
| 4,195,695 A * | 4/1980 | Dixon .......................... 172/1 |
| 4,489,790 A * | 12/1984 | Lattin ........................ 172/519 |
| 4,508,177 A | 4/1985 | Wiser |
| 4,611,668 A | 9/1986 | Hrubes |
| 4,750,792 A | 6/1988 | Caron et al. |
| 4,844,174 A | 7/1989 | Zimmerman |
| 4,865,400 A | 9/1989 | Caron et al. |
| 4,905,771 A * | 3/1990 | Stark ......................... 172/572 |
| 4,919,566 A | 4/1990 | Caron et al. |
| 4,932,477 A | 6/1990 | Atwood |
| 4,991,662 A | 2/1991 | Caron et al. |
| 5,413,055 A * | 5/1995 | Dern .......................... 111/130 |
| 5,628,372 A * | 5/1997 | Creyke ....................... 172/534 |
| 5,722,493 A | 3/1998 | Dixon |
| 5,795,097 A | 8/1998 | Caron et al. |
| 5,967,242 A | 10/1999 | Caron et al. |
| 6,682,262 B2 | 1/2004 | Caron et al. |
| 6,928,941 B1 | 8/2005 | Sternitzke |
| 6,991,401 B1 | 1/2006 | Caron |
| 2002/0000323 A1 * | 1/2002 | McDonald ................. 172/537 |

FOREIGN PATENT DOCUMENTS

| | | |
|---|---|---|
| EP | 373467 | 6/1990 |
| EP | 379672 | 8/1990 |
| EP | 1495660 A1 | 1/2005 |
| FR | 2179343 | 11/1973 |
| GB | 316739 | 8/1929 |
| WO | 0232209 A1 | 4/2002 |

OTHER PUBLICATIONS

Eusebio Ventura, Jr., et al., "A New Reservoir Tillage System for Crop Production in Semiarid Areas," ASAE Meeting Presentation Paper No. 032315, Jul. 2003, St. Joseph, Michigan.

* cited by examiner

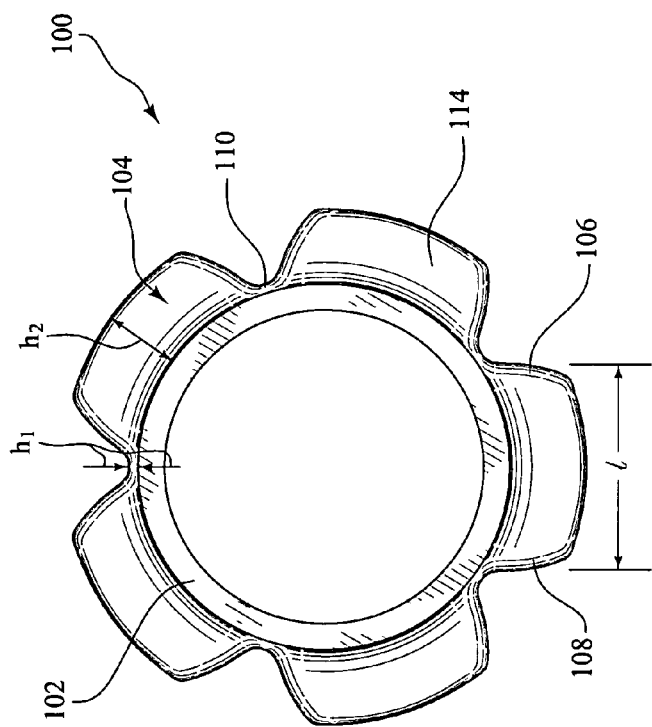
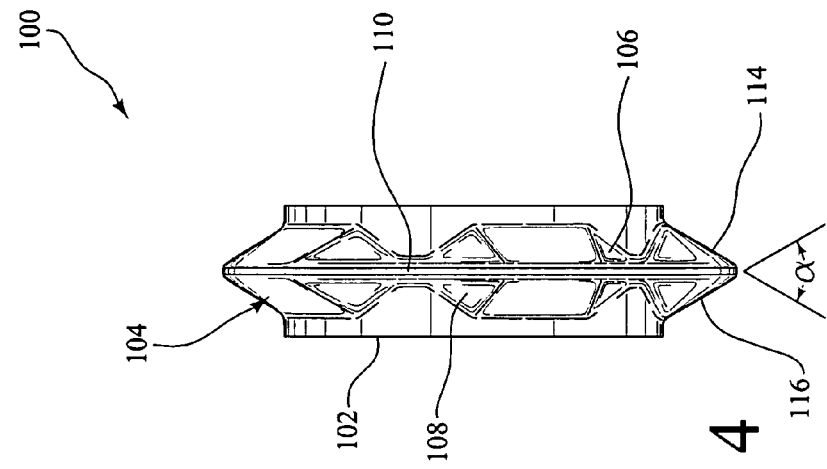
FIG. 3
FIG. 4

SOIL CONDITIONING DEVICE

CROSS-REFERENCE TO RELATED APPLICATIONS

Not applicable

BACKGROUND OF THE INVENTION

1. Field of the Invention

This invention relates to soil conservation, more specifically toward an apparatus for conditioning surface soils thereby increasing infiltration.

2. Description of the Related Art

Traditional farming comprises tasks such as plowing, disking, harrowing, seeding, fertilizing, and harvesting. During this farming process, soil is often left in a loose condition where the soil is subject to moisture evaporation and erosion. There is an increased demand to accomplish these farming tasks in a manner to conserve the soil by reducing erosion and to conserve the water by increasing the infiltration capability of the soil. Additionally, there is a demand to multitask these operations such that several tasks can be accomplished in a single pass over the land thus improving the efficiency of the farming operation and reducing costs. Due to the increasing demand for soil and water conservation as well as multitasking in farming and land management practices, it has become necessary to design machinery and supporting systems.

Traditionally, soil erosion and surface water management has been attempted with diking, imprinting and compacting systems, and reservoir tillage systems. These systems have been designed for the purpose of sealing the soil surface and/or retaining water where it falls thus reducing erosion. There are many forms of equipment available today that attempt to create irrigation pools and reservoirs in the soil surface. Examples of processes which use equipment to compact the soil into pools include furrow irrigation, diking, compacting and punching, spading and scooping, imprinting and impressing. All of these processes incorporate devices that can be mechanically driven or ground driven and can be linear or rotary in their operation. However, these traditional processes and associated devices fall short of providing a system or device which reduces erosion, reduces water runoff, increases water infiltration, and allows multitasking.

Imprinting and compacting devices compact the soil to overcome erosion by creating pools. These devices require excessive weight to be applied perpendicular to the soil surface, allowing the soil structure to be impressed in order to make their imprints. An example of an imprinting machine is the Dixon Wheel Roller™ which is designed to have the required weight to overcome the soils surface structure in order to make an impression. As a result of the compaction, the soil surface is sealed which causes the soil surface to become substantially impervious to water infiltration.

Compaction in soil is the direct result of weight applied to the soil surface. Compaction occurs quite frequently on farmland because of the type of equipment used, such as a moldboard plow or imprinting and compacting devices. Further compaction is caused by high traffic, tractors, carts, etc. on the soil surface. This compacted soil surface is commonly known as hard pan. When weight is applied to the soil, the soil structure is compressed. The greater the weight or load to the soil, the greater the amount of compaction. Compaction causes the surface soil to become compressed to such a level that it becomes substantially sealed and impervious to water. The top soil below the compacted surface soil is consequently substantially sealed off and has little water for infiltration. This in turn leads to a reduction in replenishing of water in the underlying aquifer which has contributed to the current water supply problems. Additionally, farmers need use equipment such as Rippers™, SubSoilers™, or Pan Busters™ to penetrate below the hard pan and fracture it to allow moisture to infiltrate and therefore promote root systems on the crops. This practice does little to provide a system which reduces water runoff, increase water infiltration, or allow multitasking.

More recently, imprinting type machines have been designed to require less weight to make an impression in the soil surface in an effort to overcome some of the associated problems. Even though these more recently designed machines are lighter than the Dixon Wheel™ and other similar devices, they are all still relatively heavy and decrease water infiltration capabilities of the soil.

Soil diking systems and devices have been designed to overcome some of the problems associated with the imprinting and compacting systems. Diking is accomplished by scooping, digging, and/or dragging the soil which is then left in a loose condition to form pools or reservoirs. Less weight is needed for diking than imprinting or compacting devices in an attempt to leave the soil surface more pervious to water. However, when water is applied to the loose soil it impacts and dislodges the fine particles of soil and organic matter on the sides of the dikes and washes them into the bottom of the pools. These particles of soil then seal the bottom of the pools which reduces the infiltration capability of the soil and diminishes the reduction of runoff. Additionally, the loose soil is eroded from the field in both light and heavy rainfall events.

Another recent attempt to provide soil and water conservation in farming has been the practice of no-till farming. No-till farming is where the soil is left undisturbed from harvesting to planting. Planting is accomplished in a narrow seedbed or slot created by disc openers. Coulters, residue managers, seed firmers, and modified closing wheels are used on the planter to provide adequate seed to soil contact. However, there are several disadvantages associated with no-till. No-till requires the use of herbicides to eliminate competition from weeds which raises production costs. Crop residue left on the soil hinders soil warming and drying, making planting more difficult and reduces seed germination. Conventional tillage systems cannot be used to incorporate fertilizers and herbicides. The heavy residue or foliage left on the land may result in poor seed soil contact thus reducing seed germination. Also, the soil surface is not left in a highly permeable state resulting in rain water runoff and reduced infiltration to subsurface soils and the underlying aquifer.

Most recently, reservoir tillage systems such as the one taught in U.S. Pat. No. 5,628,372 ('372) have been devised to overcome the problems associated with the aforementioned farming practices. '372 teaches an agricultural instrument having a series of multifaceted peripheral ridge members having flat leading and trailing edges selectively spaced circumscribing a disc. The ridge members have a flat circumferential section spacing therebetween. The configuration of the '372 device compacts the soil to form water retaining pools in the soil from the vertical impact of the ridge member on the soil upon rotation. This compaction reduces water infiltration into the soil. Additionally, the flat trailing edge of the multifaceted peripheral ridge member pitches the soil at rotation velocities necessary for efficient farming practices. This pitching of the soil fills in the created pools with fine particles that seal the bottom of the pools which further reduces the infiltration capability of the soil. Furthermore, pitching of the soil destroys a portion of the structure of the pool leading to early failure of the remaining pool structure.

There remains a need for improving soil and water conservation as well as providing for efficient farming practices, such as multitasking, and land management practices.

SUMMARY OF THE INVENTION

The present invention is comprised of a soil conditioning device having a series of prow shaped peripheral ridge members optionally joined by sub-ridge members circumscribing a disc, wheel or drum. When the soil conditioning device is rolled across the soil surface, a series of consolidated prow shaped hollows and optional weir formations are created in the soil enhancing soil permeability and reducing water runoff. Rolling of the soil conditioning device across the soil surface may be accomplished with a mechanized, human, or animal powered apparatus. The soil conditioning device may serve as the wheels for the apparatus rolling the soil conditioning device or passively pulled with the apparatus. Preferably a transport means such as a tractor will pull a cylindrical rolling tool having a plurality of soil conditioning devices mounted thereon. The primary purpose of the soil conditioning device is enabling the soil to retain rain water where it falls and consequently reduce erosion and increase water retention and infiltration of the soil and provide for multitasking capabilities.

The soil conditioning device is a rotary device which can be attached to most any existing agricultural and horticultural machine and may also be attached to any specially designed machine for use in construction, mining or other situations which require earthworks, including home gardening. Additionally, the soil conditioning device may be fitted to an animal or human powered device such as tri-wheeled vehicle having soil conditioning devices serving as wheels. Several soil conditioning devices may be adjacently aligned to form a soil conditioning tool in the form of a cylindrical roller having a plurality of soil conditioning devices. The device or tool is driven or rolled while being in contact with the ground forming a series of prow shaped hollows and optional adjoining weirs. Additionally, the soil conditioning device or tool can be fitted with a ratchet release, break or clutch device, or can be driven mechanically from a variety of sources at speeds necessary for multitasking.

The soil conditioning device is comprised of a relatively lightweight material. Such materials may include wood, polyurethane foam, rubber, silicon rubber, synthetic rubber, Hytrel™, urethane, various plastics or polymeric materials, and combinations thereof. Preferably, the soil conditioning device is manufactured from plastic or polymeric materials such as high density polyethylene (HDPE), polyvinyl chloride, vinyl, or other such moldable plastic materials. HDPE has been found to be advantageous since it is a material which is light weight, strong, flexible and exhibits self cleaning capabilities when applied to the soil. Optionally, the use of UV-stabilizers such as carbon black may be added to improve its weather resistance. Combinations of various polymeric materials have also exhibited the desired properties of being relatively lightweight and a having a degree of flexibility.

The soil conditioning device is molded producing a circular outer skin having a series of prow shaped peripheral ridge members optionally joined by sub-ridge members surrounding a hollow core. This design and material of manufacture allows the shape, hardness, and weight to be adjusted at its point of use by a farmer or other user for various soil types. This adjustability enables it to work efficiently in a variety of conditions. The adjustment is accomplished by filling the hollow core through a valve in the soil conditioning device. The core may be filled with compressed air or other gases, water or other liquids, gels, solids, expanding foam, a mixture of air and water, or any combination thereof to obtain the desired shape, hardness, and/or weight.

The soil conditioning device molds or consolidates the soil upon which it is rolled or driven upon by applying light pressure to the soil surface in a substantially horizontal direction so as to lightly consolidate or bind the outermost surface of the soil together. Consolidating the soil surface lightly sticks the outermost surface soil particles together leaving a porous permeable soil surface for greater infiltration capabilities. As the device travels through the soil, the soil flows over and around the various component surfaces of the device restructuring the soil to a desired form. While the soil flows over and around the various surfaces, the soil is caused to lift and flow in a bow wave fashion behind the device or tool having a plurality of devices. While the soil is in the flowing state, the device is rotating within the soil flow and forming, ushering, and gently kneading the soil while ushering it into place producing a series of consolidated hollows and optional weirs, therefore leaving the soil surface in a "Geometric Ordered Roughness (GOR), necessary for the control of erosion caused by water and wind, in a process known as "Hydroforming". This process of consolidating the soil requires little or no additional pressure or force perpendicular to the soil surface thus providing little or no compaction to the surface soil. The consolidation is accomplished in a substantially lateral direction and shapes a structure in the soil consisting of various curves and angles forming prow shaped hollows and optional adjoining weirs which increases the soil surface area. The increase in permeability and surface area of the soil surface both contribute to the increase in soil infiltration and consequent reduction in erosion. Additionally, the prow shape of the ridge allows for the device to be operated at speeds necessary for efficient farm practices.

The soil conditioning device of the present invention consolidates the soil surface into a series of permeability or porous prow shaped hollows and optional adjoining weirs controlling water flow and increasing the surface area of the soil contacting rain water thus increasing the effective infiltration rate of the soil. These prow shaped hollows and optional adjoining weirs are designed to slow and/or stop flowing water while allowing it to infiltrate the soil. These structures are consolidated evenly over their entire surface of the soil increasing the surface area of the soil and increasing the infiltration rate of the soil. Additionally, increase surface area increases soil warming from the sun allowing for improved seed germination. Below this molded or consolidated surface, the soil structure remains loose thus allowing water to percolate throughout the soil. These prow shaped hollows and optional adjoining weirs increased porosity, infiltration rate, and water absorbing capability of the soil directly reducing erosion of the soil by substantially eliminating and/or slowing water runoff. Additionally, surface ponding on fields is reduced since rainfall or irrigation water is more easily absorbed by the soil having a higher porosity and surface area in contact with the water.

The soil conditioning device has many applications and benefits. It is capable of working on most all soil types and agricultural applications, such as planting, surface water control, soil warming, reducing wind erosion, cultivating and plowing, or common construction applications, such as scraping, building berms, reclaiming land, or even creating meridians between interstate highways.

BRIEF DESCRIPTION OF THE DRAWINGS

FIG. 3 is a side view of the soil conditioning device of FIG. 1 showing the relative size of the prow shaped ridge members and subridge members circumscribing a wheel.

FIG. 4 is a front view of the soil conditioning device of FIG. 1 showing the angle between opposing sides of the prow shaped ridge members circumscribing a wheel.

DETAILED DESCRIPTION

Figure 1:
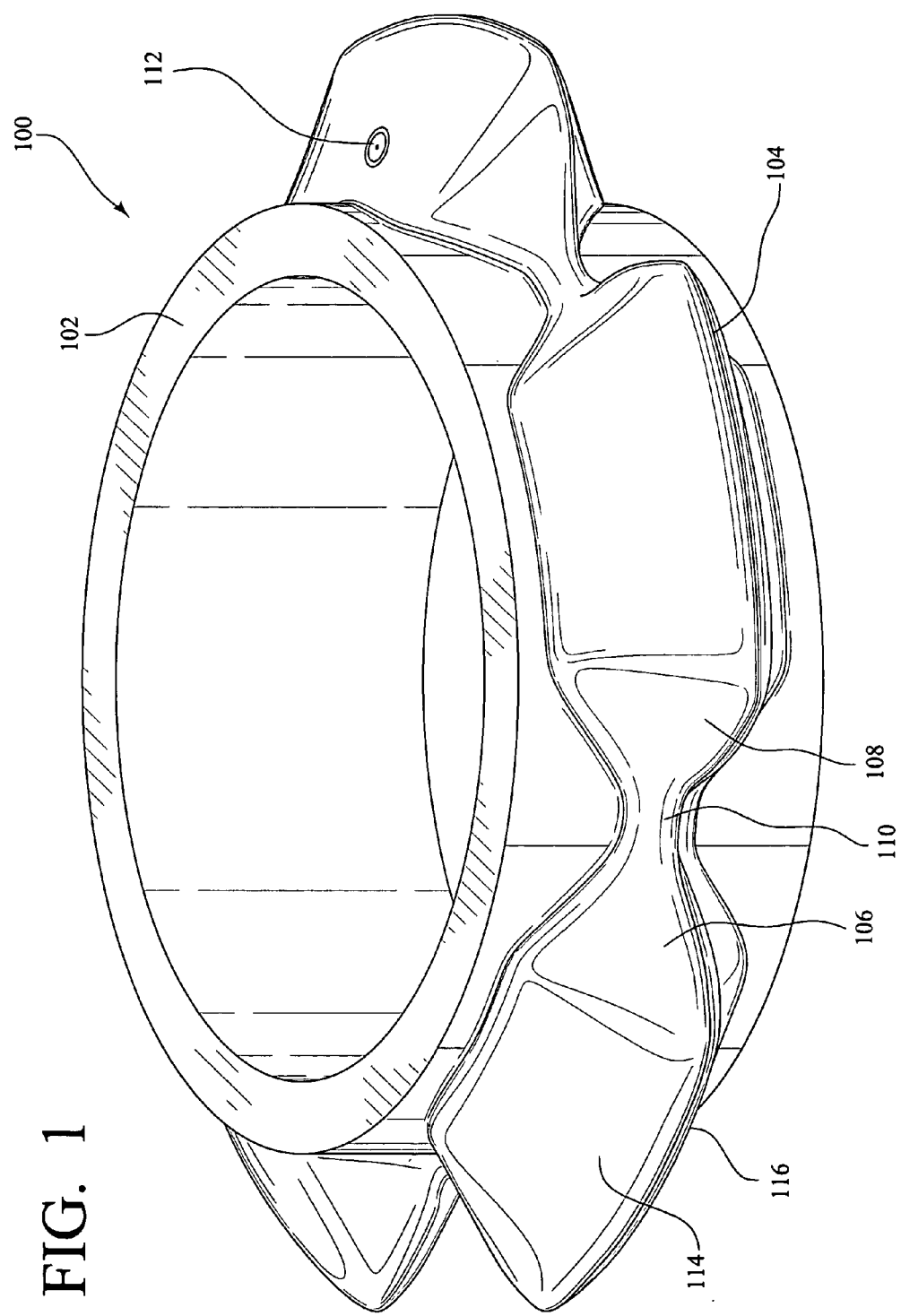
FIG. 1 is a perspective view of the soil conditioning device of the present invention showing the prow shaped ridge members and subridge members circumscribing a wheel.

FIG. 1 shows soil conditioning device 100 having a series of prow shaped peripheral ridge members 104 joined by sub-ridge members 110 circumscribing wheel or disc 102. Each of the plurality of ridge members 104 has a leading prow shaped surface 106 and a trailing prow shaped surface 108. Spanning between each leading surface 106 and trailing surface 108 is a subridge member 110. This embodiment of the soil conditioning device may also be described as a wheel member 102 having a central continuous outer peripheral ridge of varying heights about wheel member's 102 circumference. The peripheral ridge is formed by prow shaped peripheral ridge members 104 having leading prow shaped surface 106 and trailing prow shaped surface 108. Ridge members 104 are joined or interposed by sub-ridge members 110 and have a rounded top surface and side walls 114 and 116 sloping toward wheel member 102.

Soil conditioning device 100 is shown circumscribing wheel 102 and being of a unitary material having a hollow interior. Preferably, soil conditioning device 100 is formed with a polymeric material. More preferably, the polymeric material forming the soil conditioning device of the present invention is high density polyethylene. Optionally, a UV-stabilizer such as carbon black may be added to the polymeric material to improve its weather resistance.

Valve 112 is shown is shown in a sloping sidewall 114 of ridge member 104 and provides injection access to the inner core of device 100. Compressed air or other gases, liquids, gels, solids, or any combination thereof may be injected into the inner core through valve 112 to obtain a desired shape, hardness, and/or weight of device 100.

Rolling or driving soil conditioning device 100 upon the soil surface creates a permeable soil surface having a series of weirs and an increased surface area improving infiltration and controlling water flow thereupon. The soil surface is consolidated improving resistance to movement of soil particles by moving water while increasing permeability thus increasing infiltration capability of the soil. The weirs slow and direct the flow of water upon the soil surface, resulting in a cascading effect. This cascading effect reduces the inertia of the flowing water minimizing the soil's erosion. These soil structures increase the soil surface area and decrease water run-off.

Figure 2:
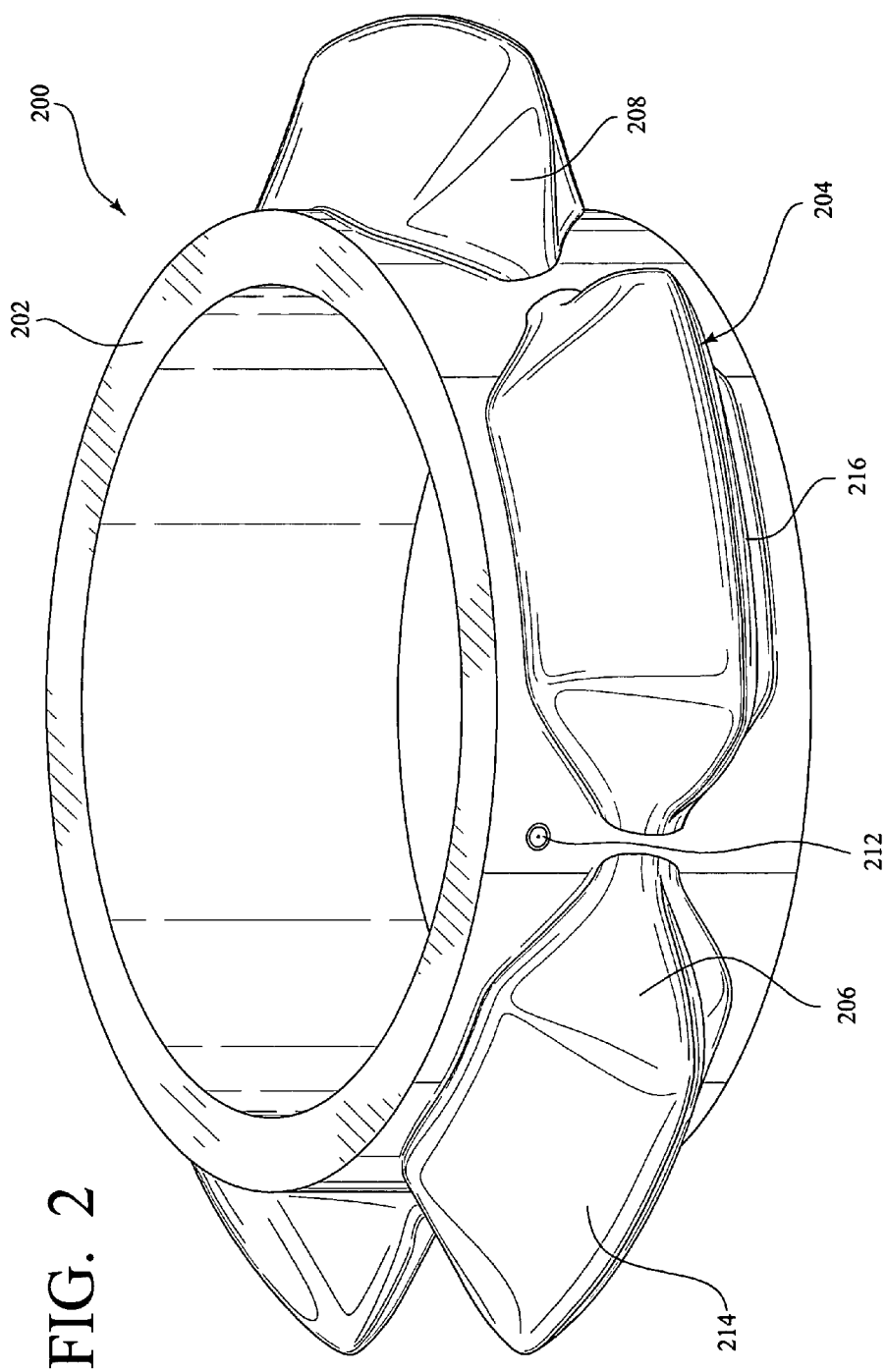
FIG. 2 is a perspective view of an embodiment of the soil conditioning device of the present invention showing a plurality of spaced prow shaped ridge members circumscribing a wheel.

FIG. 2 shows soil conditioning device 200 having a plurality of prow shaped peripheral ridge members 204 selectively spaced about a peripheral surface of disc or wheel or disc 202. Each of the plurality of ridge members 204 has a leading prow shaped surface 206 and a trailing prow shaped surface 208. Soil conditioning device 200 may also be described as wheel member 202 having a series of central disjointed outer peripheral ridge members 204 wherein each peripheral ridge member 204 has a prow shaped leading end 206, a prow shaped trailing end 208, and two opposing sloping sidewalls 214 and 216 sloping toward wheel 202.

Soil conditioning device 200 is shown circumscribing wheel 202 and being of a unitary material having a hollow interior. Optional valve 212 is shown in wheel 202 providing material access to the core of device 200. Rolling soil conditioning device 200 upon the soil surface consolidates the surface soil laterally into a series of preselectively spaced prow shaped hollows.

FIG. 3 shows soil conditioning device 100 of FIG. 1 having prow shaped ridge members or sections 104 interposed with subridge members or sections 110 circumscribing wheel or disc 102. Interposed ridge members 104 and subridge members 110 form a central continuous outer peripheral ridge of varying heights circumscribing wheel 102. Ridge sections 104 are of a primary height $h_2$ and subridge sections 110 are of a secondary height $h_1$. Primary height $h_2$ is greater than secondary height $h_1$. Preferably, $h_2$ exceeds $h_1$ in a range of approximately 1.5 inches to 5 inches. Also in this embodiment, each ridge section 104 has a primary height $h_2$ extending continuously about the circumference of wheel 102 (l) in a range of about 5 inches to 10 inches.

FIG. 4 shows a front view of soil conditioning device 100 with prow shaped ridge members 104 and subridge members 110 circumscribing wheel 102. Shown here are opposing side walls 114 and 116 of ridge member or section 104 having an angle α therebetween. Preferably angle α is in a range of approximately 40° to 80°, and more preferably is approximately 60°.

Figure 5:
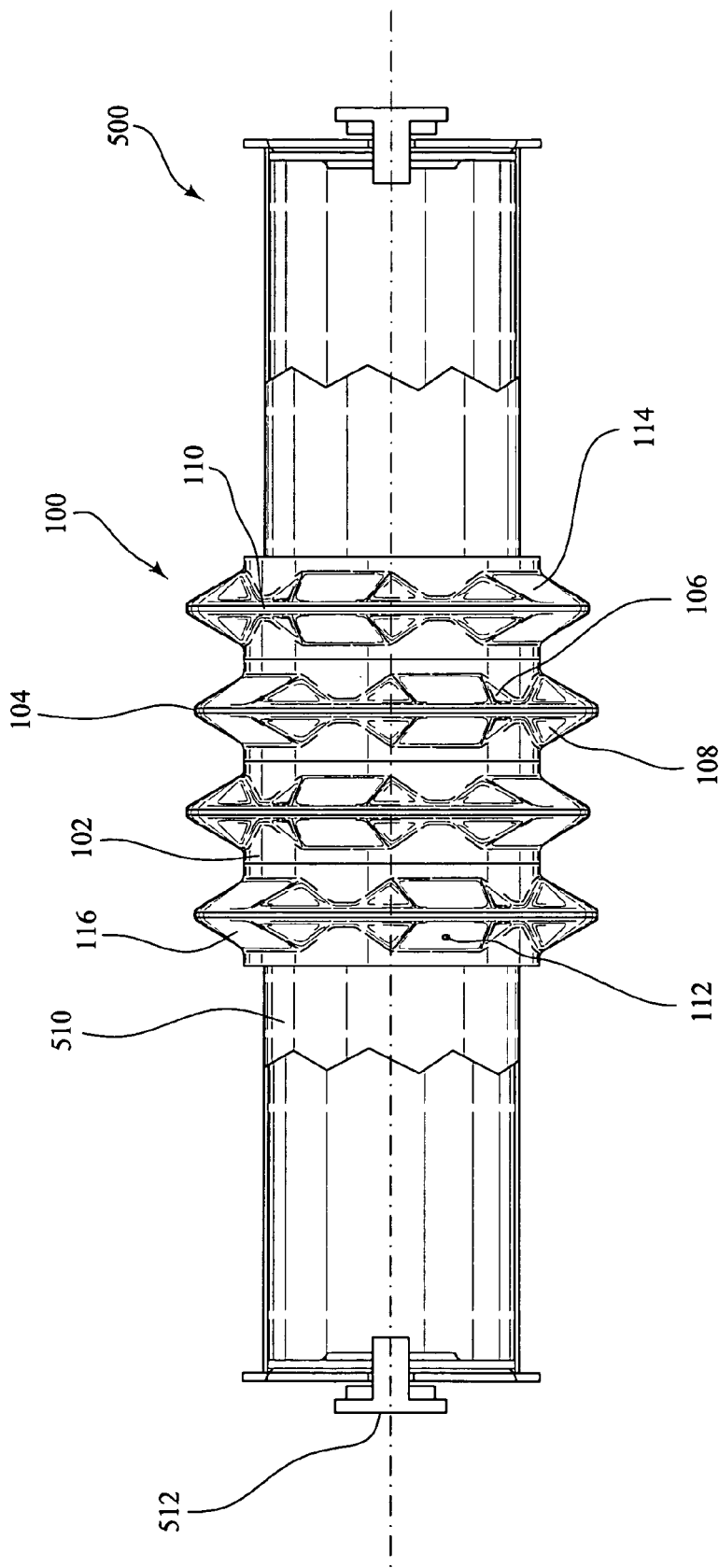
FIG. 5 is a front view of a soil conditioning tool incorporating a plurality of the soil conditioning devices of FIG. 1.

FIG. 5 shows soil conditioning tool 500 incorporating a plurality of the soil conditioning devices 100. Soil conditioning devices 100 are axially aligned and retained forming cylindrical rolling tool 500. In the embodiment shown, soil conditioning devices 100 are adjacent one another in a staggered ridge member 104 alignment. However, soil conditioning devices 100 may be in a spaced configuration on cylindrical roller 510 and may as well be in a configuration having ridge members 104 aligned radially about cylindrical roller 510. Attaching hubs 512 extend axially from each end of cylindrical roller 510 for rotatingly attaching to a transport means such as a tractor or as the last device in a multitasking train of farming tools, or optionally placed in various positions within the train of farming tools, providing for an efficient method of soil and water conservation easily incorporated into current farming practices.

Figure 6:
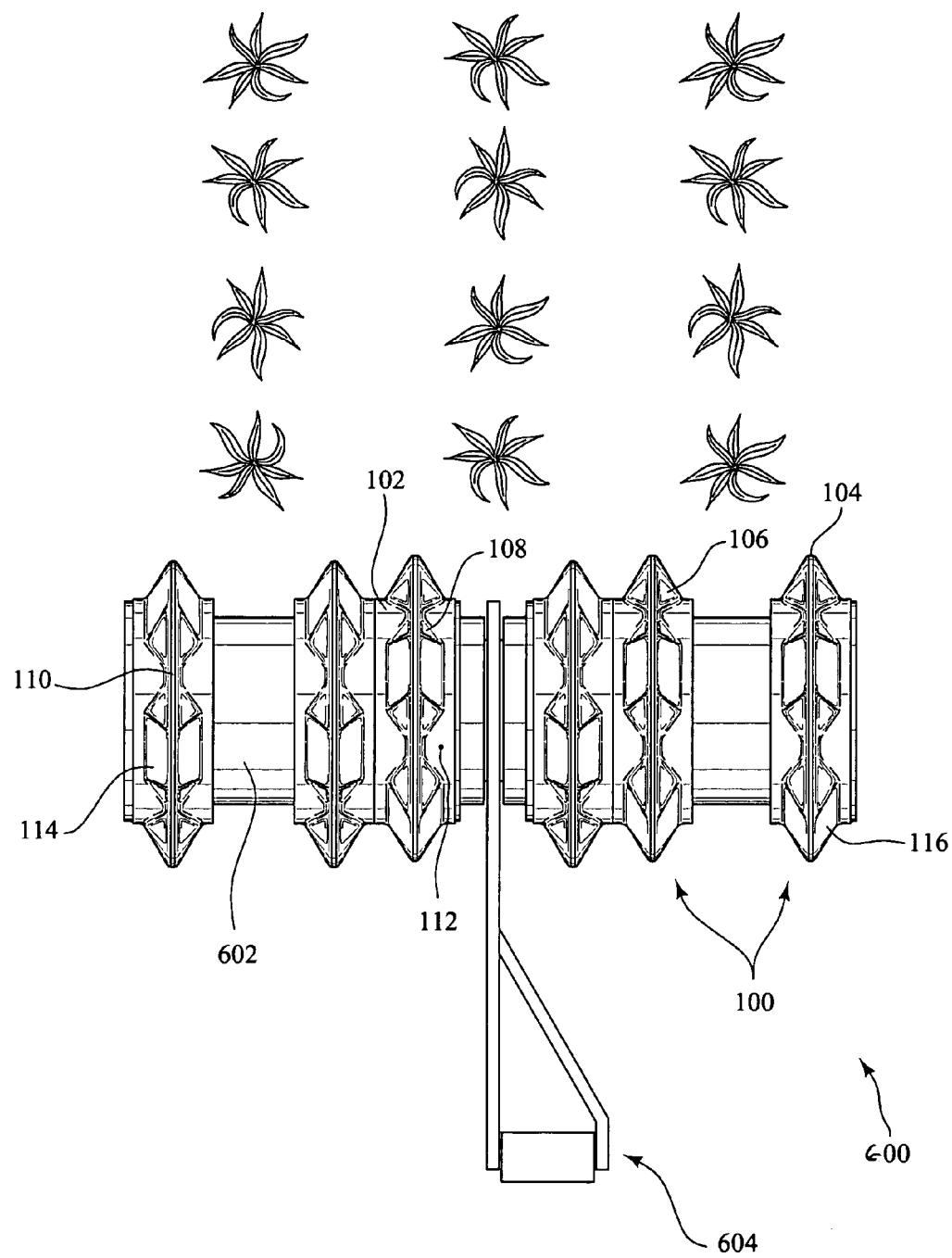
FIG. 6 is a top view of a soil conditioning tool incorporating a plurality of the soil conditioning devices of FIG. 1 for use after planting.

FIG. 6 shows a top view of soil conditioning tool 600 incorporating a plurality of the soil conditioning devices 100 of FIG. 1 for use after planting. Soil conditioning devices 100 are axially aligned, spaced, and retained forming cylindrical rolling tool 600. A plurality of pairs of soil conditioning devices 100 are adjacent one another in a staggered ridge member 104 alignment on cylindrical roller 602. However, soil conditioning devices 100 may be spaced having three, four or even more soil conditioning devices 100 adjacently aligned and the spacing between adjacent devices 100 may vary depending upon the size of the plants. Cylindrical roller 602 may be in a configuration having ridge members 104 aligned radially about cylindrical roller 602. Attaching arm 604 extends radially from a center portion of cylindrical roller 602 for rotatingly attaching to a transport means such as a tractor or as the last device in a multitasking train of farming tools.

Figure 7:
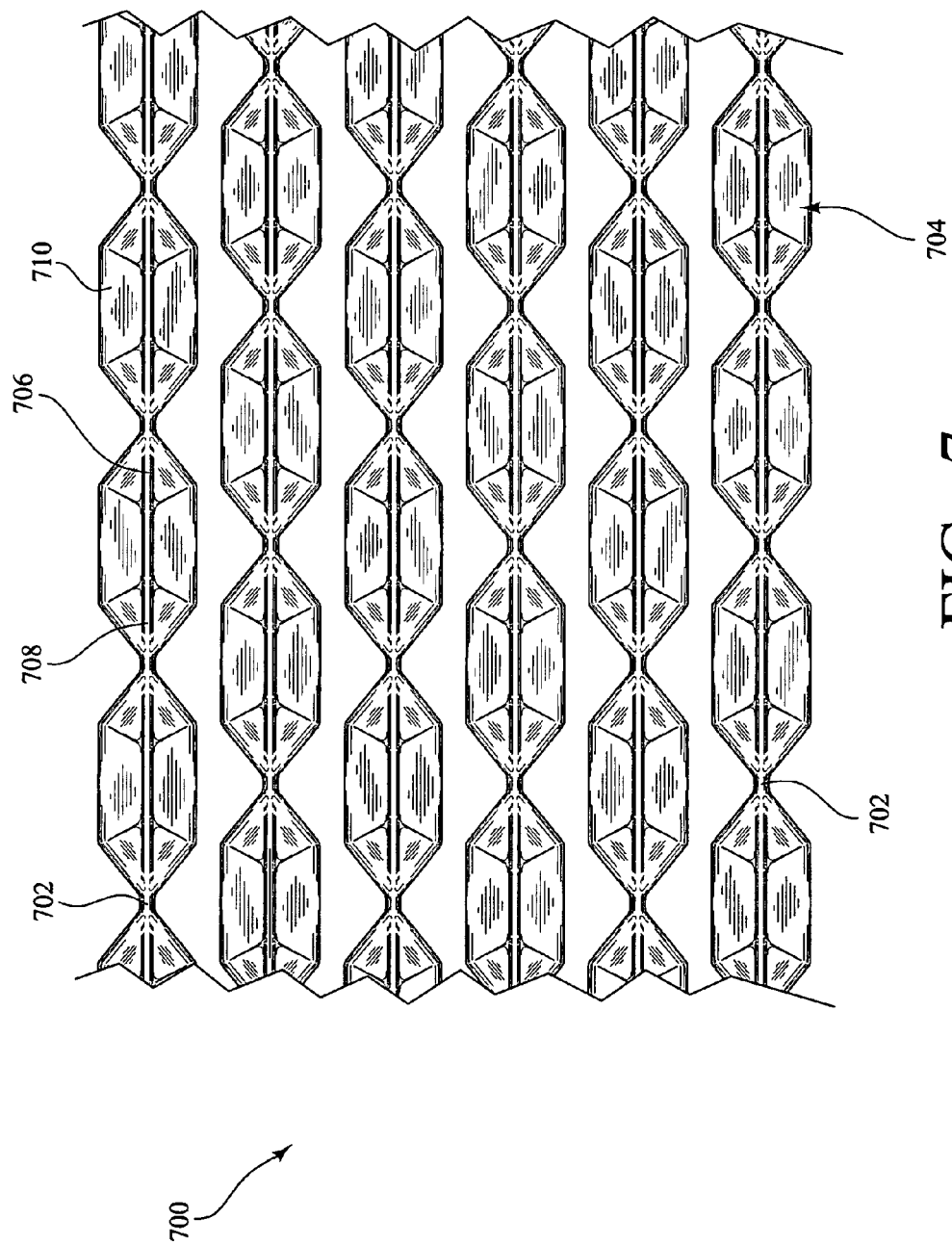
FIG. 7 is a top view of a soil imprint formed by the tool of FIG. 5.

FIG. 7 shows a top view of soil imprint 700 formed by soil conditioning tool 500 of FIG. 5 or other device having at least one soil conditioning device incorporated therein. Having soil conditioning tool 500 driven (i.e. used as a powered wheel) or rolled (i.e. passively pulled or pushed) by mechanical, animal, or human power upon the surface soil while being in contact with the ground consolidates the soil into a series of prow shaped hollows 704 and adjoining weirs 702. Leading end 708, mid-section 710, and trailing end 706 make up hollow 704 and are formed by sections or walls 106, 114, 116, and 108 of device 100 respectively.

Figure 8:
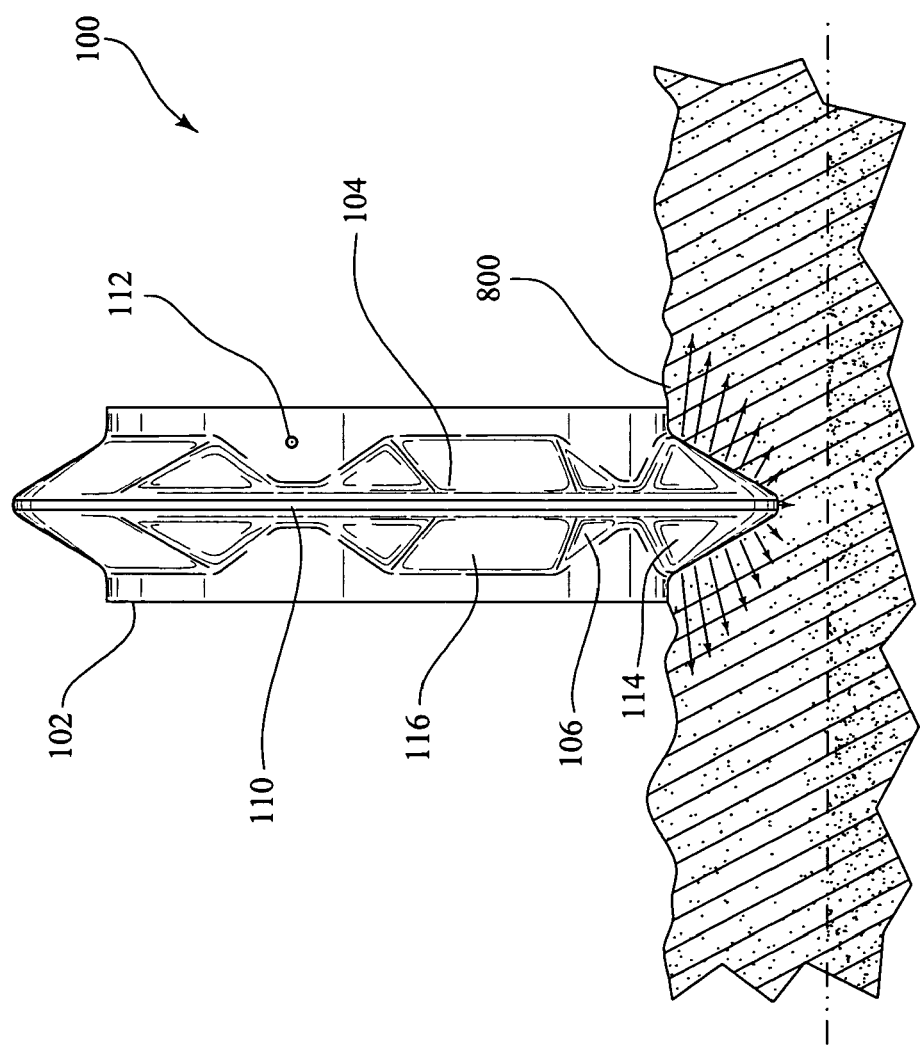
FIG. 8 is cross-sectional view of soil being consolidated by the device of FIG. 1.

FIG. 8 shows a cross-sectional view of soil being conditioned by soil conditioning device 100 of FIG. 1. Shown here are force vectors 800 primarily in a lateral direction consolidating the soil surface. As device 100 rolls upon the land, leading prow shaped surface 106 makes contact with the soil and as device 100 continues to roll, leading prow surface 106 and ridge member 104 laterally consolidates the soil as shown by force vectors 700. Having prow shaped leading edge 106 first contacting the soil allows the soil to be consolidated with less than about fifty pounds force per ridge member 104. Additionally, having trailing surface 108 in a prow shape allows device 100 to move about the soil surface at speeds of up to about 14 mph without throwing or pitching the soil.

Figure 8A:
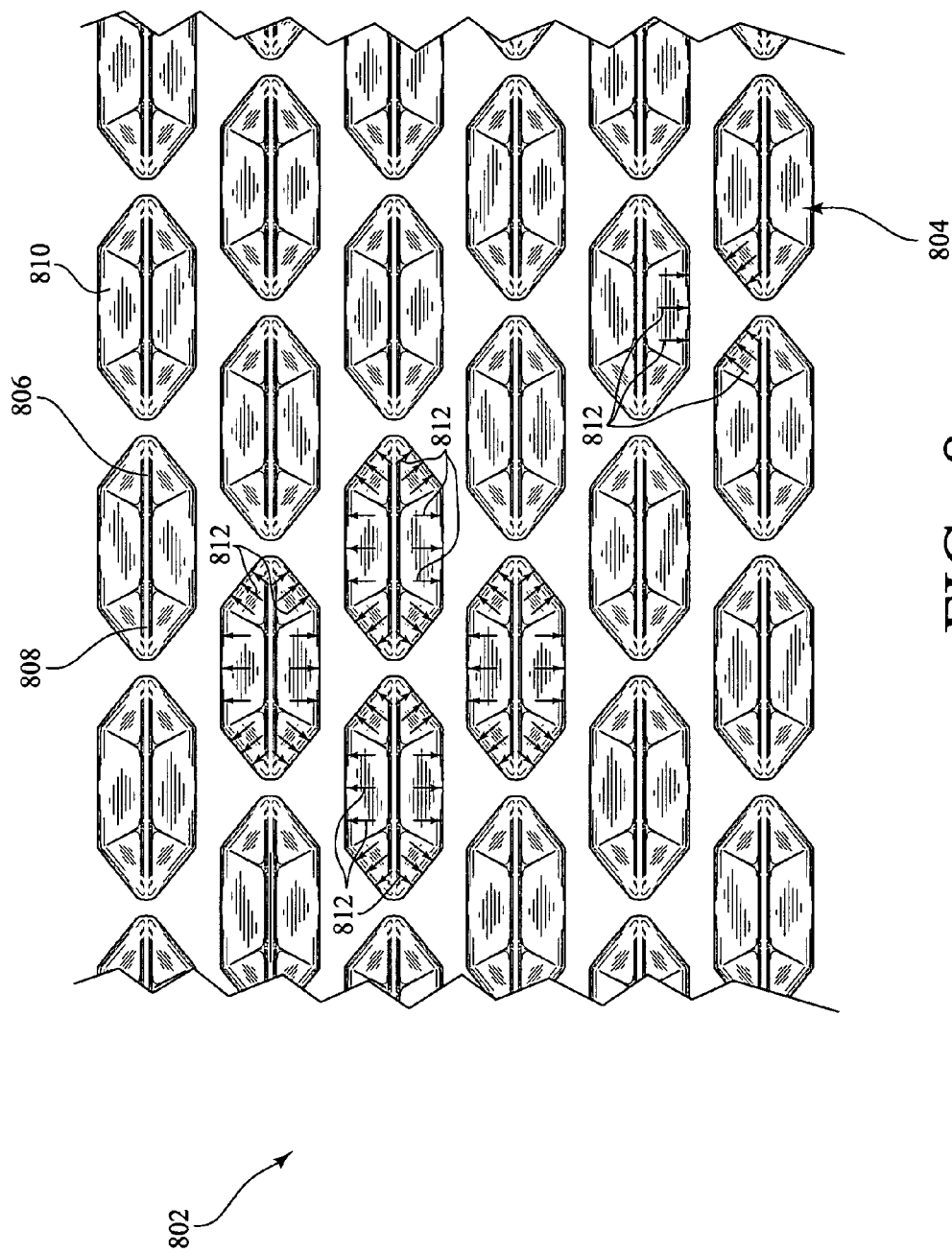
FIG. 8a is a top view of the soil having been consolidated by the device of FIG. 2.

FIG. 8a shows a plan view of the soil having been conditioned by soil conditioning device 200 of FIG. 2. Shown here are force vectors 812 indicating the lateral direction of consolidation and primarily showing the forward and rearward direction of consolidation achieved by the prow shaped ridge members 204 forming a series of prow shaped hollows 804. Prow shaped hollows 804 have leading end 808, mid-section 810, and trailing end 806 and are formed by sections or walls 206, 214, 216, and 208 of device 200 respectively.

Figure 9A:
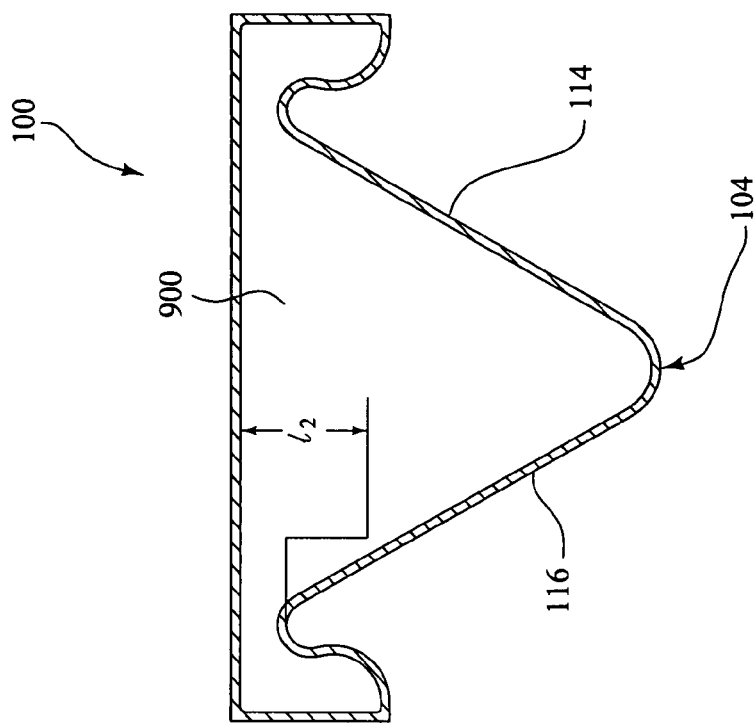
FIG. 9a is a cross-sectional view of a soil conditioning tool in a retracted state.
Figure 9:
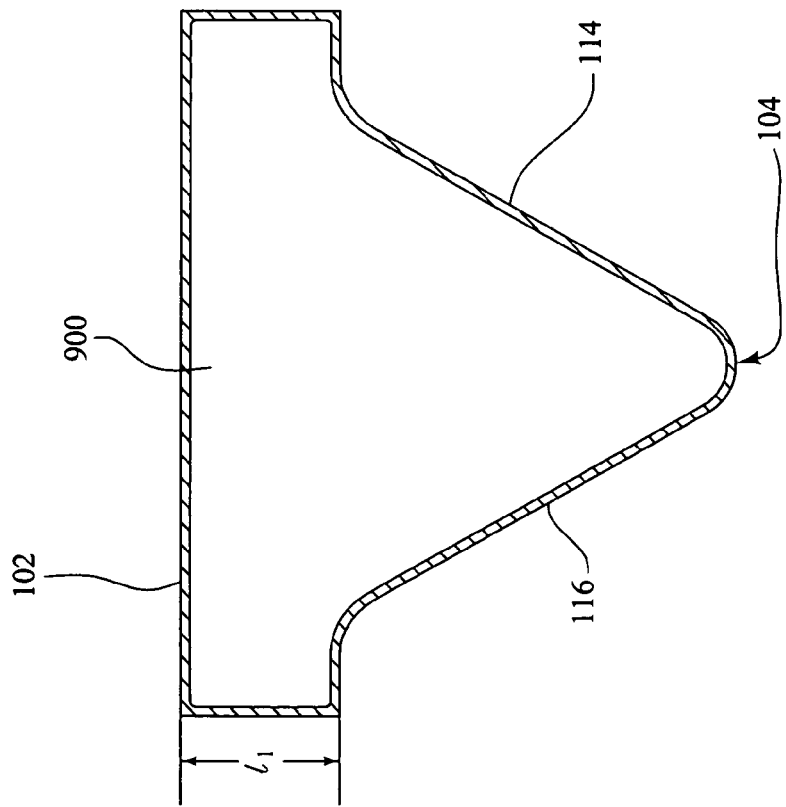
FIG. 9 is a cross-sectional view of a soil conditioning tool in an expanded state.

FIGS. 9 and 9a show a cross-sectional view of soil conditioning device 100 in an expanded state and a retracted state respectively. Having soil conditioning tool 100 comprised of a flexible material such as a polymeric material and formed having a hollow center or cavity allows ridge member 104 to retract when device 100 encounters a radial force as is likely when device 100 encounters a rock or other hard material within the surface soil. The force required to retract ridge member 104 within device 100 may be adjusted by filling core 900 of device 100 with compressed air or other gases, liquids, gels, solids, or any combination thereof to obtain a desired hardness. This retractability of ridge member 104 provides that a substantially consistent horizontal force within the surface soil is provided, hence uniform consolidation is achieved. A retraction of $l_1$ less $l_2$ is possible without substantially altering the configuration of ridge members 104.

The present invention is a soil conditioning device having a series of prow shaped peripheral ridge members optionally joined by sub-ridge members circumscribing a disc, wheel or drum and a method for creating a permeable soil surface. The prow shape peripheral ridge members consolidate the soil in varying degrees from the top of the impression to the bottom of the impression which increases water infiltration and reduces soil erosion. At the top of the impression the soil is at a greater risk of erosion by surface water run-off, therefore the soil is consolidated to a greater degree. At the bottom of the impression the risk of erosion is considerable reduced and as a maximum infiltration rate is required to absorb the accumulating water, the soil is consolidated to the minimum to enable the soil to stay in place, allowing maximum percolation of the accumulating water by interstitial flow. When the soil conditioning device is moved on the land the prow shaped ridge member enters the soil sweeping the soil sideways so as to consolidate the soil laterally. This is in contrast to compacting the soil as is the case in more traditional devices. Furthermore, as the device leaves the soil, this sideways sweeping action consolidates the soil laterally at the front of the impression leaving the impression in a stable condition structurally and allowing for the maximum water infiltration and percolation. This is in contrast with the more traditional systems where the soil is left loose and highly errodable as the devices exit the soil.

I claim:

1. A soil conditioning device, comprising a substantially hollow annular body, a plurality of substantially hollow peripheral ridge members extending from and in open communication with said substantially hollow annular body, said substantially hollow annular body and said plurality of substantially hollow peripheral ridge members being formed of a flexible lightweight material, each of said peripheral ridge members having a first surface and a second surface defining said peripheral ridge member, said peripheral ridge member further having a leading prow shaped end and a trailing prow shaped end, said leading prow shaped end and said trailing prow shaped end each curved about two substantially perpendicular axes, said soil conditioning device being suitable for consolidating soil.

2. The soil conditioning device of claim 1 wherein said substantially hollow peripheral ridge members are joined by substantially hollow sub-ridge members forming a single ridge of varying height circumscribing said hollow annular body.

3. The soil conditioning device of claim 1 having at least one polymeric material forming said substantially hollow ridge members.

4. The soil conditioning device of claim 1 wherein said substantially hollow peripheral ridge members and said hollow annular body are of a unitary material having a hollow interior.

5. The soil conditioning device of claim 4 wherein said substantially hollow interior of said hollow annular body has a filler selected from the group consisting of compressed gases, liquids, gels, solids, foams, and combinations thereof.

6. The soil conditioning device of claim 5 further having a valve for introduction of said filler material.

7. The soil conditioning device of claim 1 having a plurality of said soil conditioning devices axially aligned and retained forming a cylindrical rolling tool 8. The soil conditioning device of claim 7 wherein said plurality of said soil conditioning devices comprises at least two of said plurality of said soil conditioning devices adjacently aligned.

9. A soil conditioning device comprising a substantially hollow wheel member having a circumferential surface at an outermost radius, a centrally disposed substantially hollow continuous flexible outer peripheral ridge extending radially from said circumferential surface, said substantially hollow peripheral ridge and said substantially hollow wheel being formed of lightweight flexible material and in open communication with each other, said substantially hollow peripheral ridge varying between first and second heights about said substantially hollow wheel member's circumferential surface, said first height and said second height being above said circumferential surface, said first height being less than said second height.

10. The soil conditioning device of claim 9 wherein said substantially hollow continuous outer peripheral ridge has a plurality of sections of said second height, each of said sections being interposed with a ridge member of a height varying between said first and second heights, each of said plurality of sections of a second height having an arc length about said wheels circumferential surface in a range of about 5 inches to 10 inches.

11. The soil conditioning device of claim 10 wherein said second height exceeds said first height in a range of approximately 1.5 inches to 5 inches.

12. The soil conditioning device of claim 10 wherein each of said ridge sections of said second height have a leading edge and a trailing edge, said leading and trailing edges sloping toward said wheel circumferential surface and said ridge section of a varying height forming a leading and trailing prow shaped surface.

13. A device for creating a permeable soil surface having an increased surface area, comprising a substantially hollow round device having a plurality of substantially hollow peripheral ridge members, said round device and peripheral ridge members formed of lightweight flexible material, said substantially hollow round device and said substantially hollow peripheral ridge members being in open communication and each of said substantially hollow peripheral ridge members having a leading and trailing prow shaped surface positioned about said substantially hollow round device, each of said substantially hollow peripheral ridge members having a first side wall surface and a second side wall surface, each of said side wall surfaces curving inwardly forming a rounded leading edge where said leading edge curves downward from a top of said substantially hollow peripheral ridge member to said substantially hollow round device.

14. The device for creating a permeable soil surface of claim 13 wherein each of said plurality of substantially hollow ridge members are interposed with a substantially hollow subridge member forming weirs in said soil, said substantially hollow subridge members having said first and second surfaces.

15. The device for creating a permeable soil surface claim 13 wherein said device is comprised of a flexible material that imparts a substantially consistent lateral force within said surface soil.

16. The device of claim 15 wherein said flexible material is a polymeric material.

17. The device of claim 16 wherein said polymeric material is selected from the group consisting of polyurethane foam, rubber, silicon rubber, synthetic rubber, urethane, HDPE, and combinations thereof.

18. The device of claim 17 wherein said polymeric material is HDPE.

19. A soil consolidating device, comprising a substantially hollow wheel with a circumferential surface having a plurality of substantially hollow flexible ridge members each defined by a first side wall and a second side wall, said substantially hollow wheel being in open communication with said substantially hollow ridge members, said hollow wheel and said ridge members being formed of a lightweight flexible material, each of said substantially hollow ridge members further having a ridge including a rounded leading edge at one end of said substantially hollow ridge member and a rounded trailing edge at an opposite end of said substantially hollow ridge member, a longitudinal axis generally defined between said leading edge and trailing edge of each of said substantially hollow ridge members, said rounded leading edge curved about said longitudinal axis and from said ridge to said circumferential surface, said rounded trailing edge curved about said longitudinal axis and from said ridge to said circumferential surface, wherein said first side wall curves to said second side wall and said ridge curves from an uppermost height to said circumferential surface.

20. The soil consolidating device of claim 19 wherein each of said plurality of substantially hollow ridge members are spaced about said circumferential surface of said wheel.

21. The soil consolidating device of claim 20 wherein said substantially hollow ridge members are equally spaced about an arcuate of length of said circumferential surface.

22. The soil consolidating device of claim 20 wherein said leading edge of a first substantially hollow ridge member joins a trailing edge of an adjacent substantially hollow ridge member forming a substantially hollow subridge interposing each of said substantially hollow ridge members.

23. The soil consolidating device of claim 21 wherein said leading edge of a first substantially hollow ridge member joins a trailing edge of an adjacent substantially hollow ridge member forming a substantially hollow subridge interposing each of said substantially hollow ridge members.

24. A soil conditioning device, comprising:
a substantially hollow annular wheel member formed of a flexible lightweight material and having an outer surface;
a plurality of substantially hollow peripheral ridge members comprised of said flexible lightweight material extending from said outer surface, said substantially hollow annular wheel and said plurality of substantially hollow peripheral ridge members in open communication;
each of said substantially hollow ridge members having a first surface and a second surface joining to form a ridge portion;
said substantially hollow ridge members having a leading end curved from said outer surface to said ridge portion and from said first side to said second side;
said substantially hollow ridge members having a trailing end curved from said outer surface to said ridge portion and from said first side to said second side.

25. The soil conditioning device of claim 24 further comprising a ridge extending continuously about said outer surface.

26. The soil conditioning device of claim 25 wherein said ridge continuously extending around said outer surface comprises a plurality of portions having a first height and a plurality of portions having a second height disposed between said plurality of portions having said first height.

27. A soil consolidating device, comprising:
a substantially hollow annular wheel comprised of a flexible lightweight material having an outer surface;
a plurality of substantially hollow peripheral ridge members comprised of said flexible lightweight material extending from said outer surface;
each of said substantially hollow ridge members having a first side surface joining with a second side surface forming a leading edge, an outer edge, and a trailing edge.

28. The soil consolidating device of claim 27 wherein said leading, outer, and trailing edges of said substantially hollow ridge members are rounded.

29. A soil conditioning device suitable for creating a water permeable soil surface, comprising:
- a substantially hollow annular wheel having an outer surface;
- a plurality of substantially hollow peripheral ridge members extending from said outer surface;
- said wheel and said peripheral ridge members being formed of a lightweight flexible material;
- each of said substantially hollow ridge members having a first side surface joining with a second side surface forming a leading edge, an outer edge, and a trailing edge, said edges being rounded;
- said leading edge and said trailing edge each being curved from said outer edge to said outer surface of said substantially hollow annular wheel and from said first side surface to said second side surface.

30. The soil conditioning device of claim 29 being comprised of a flexible material.

* * * * *